(12) United States Patent
Chien

(10) Patent No.: US 10,162,193 B1
(45) Date of Patent: Dec. 25, 2018

(54) AUTOMATICALLY-ADAPTING OPHTHALMIC LENS AND INTRAOCULAR LENS

(71) Applicant: MiiCs & Partners (Shenzhen) Co., Ltd., Shenzhen (CN)

(72) Inventor: Hsiu-Wen Chien, New Taipei (TW)

(73) Assignee: MiiCs & Partners (Shenzhen) Co., Ltd., Shenzhen (CN)

( * ) Notice: Subject to any disclaimer, the term of this patent is extended or adjusted under 35 U.S.C. 154(b) by 0 days.

(21) Appl. No.: 15/638,835

(22) Filed: Jun. 30, 2017

(30) Foreign Application Priority Data

Jun. 23, 2017 (TW) .............................. 106121027 A

(51) Int. Cl.
G02C 7/04 (2006.01)

(52) U.S. Cl.
CPC ............... *G02C 7/049* (2013.01); *G02C 7/04* (2013.01); *G02C 2202/06* (2013.01)

(58) Field of Classification Search
CPC ....... G02C 7/049; G02C 7/04; G02C 2202/06
USPC .................................. 351/41, 159.01, 159.02
See application file for complete search history.

(56) References Cited

U.S. PATENT DOCUMENTS 9,046,699 B2 * 6/2015 Caldarise .............. A61F 9/0017

* cited by examiner

*Primary Examiner* — Tuyen Tra
(74) *Attorney, Agent, or Firm* — ScienBiziP, P.C.

(57) ABSTRACT

An intraocular/intraocular lens which automatically adapts in radius to the corneal radius of the eye of a user includes a reversible gel layer. The reversible gel layer includes a contact surface. Radius of curvature of the contact surface changes when under a chemical reaction of the reversible gel layer induced by temperature, light, or acidity, the reaction being reversible.

20 Claims, 2 Drawing Sheets

AUTOMATICALLY-ADAPTING OPHTHALMIC LENS AND INTRAOCULAR LENS

CROSS-REFERENCE TO RELATED APPLICATIONS

This application claims priority to Taiwanese Patent Application No. 106121027 filed on Jun. 23, 2017, the contents of which are incorporated by reference herein.

FIELD

The subject matter herein generally relates to eye health, and automatically-adapting ophthalmic lens and intraocular lens.

BACKGROUND

Ophthalmic/intraocular lens are commonly worn by users to correct vision, or for cosmetic or therapeutic reasons. Usually, radius of curvature of an ophthalmic/intraocular lens is predetermined. However, radiuses of cornea curvature of different users are very different, and an ophthalmic/intraocular lens having a predetermined radius of curvature probably will not be matched with the corneas of different users.

BRIEF DESCRIPTION OF THE DRAWINGS

Implementations of the present technology will now be described, by way of example only, with reference to the attached figures.

DETAILED DESCRIPTION

Figure 1:
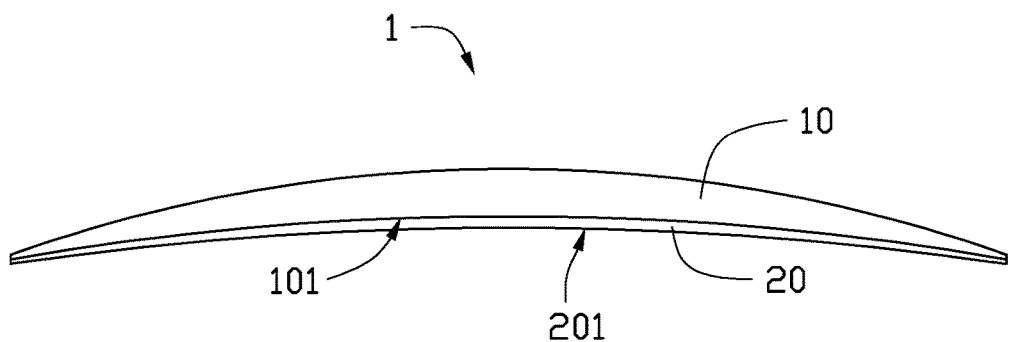
FIG. 1 is a cross-sectional view of an ophthalmic lens according to an exemplary embodiment.

It will be appreciated that for simplicity and clarity of illustration, where appropriate, reference numerals have been repeated among the different figures to indicate corresponding or analogous elements. In addition, numerous specific details are set forth in order to provide a thorough understanding of the exemplary embodiments described herein. However, it will understood by those of ordinary skill in the art that the exemplary embodiments described herein can be practiced without these specific details. In other instances, methods, procedures, and components have not been described in detail so as not to obscure the related relevant feature being described. Also, the description is not to be considered as limiting the scope of the exemplary embodiments described herein. The drawings are not necessarily to scale and the proportions of certain sections have been exaggerated to better illustrate details and features of the present disclosure.

Several definitions that apply throughout this disclosure will now be presented.

The term "comprising," when utilized, means "including, but not necessarily limited to"; it specifically indicates open-ended inclusion or membership in the so-described combination, group, series, and the like.

FIG. 1 illustrates an exemplary embodiment of an automatically-adapting ophthalmic lens 1 including a matrix 10 and a reversible gel layer 20.

The matrix 10 and the reversible gel layer 20 all can be made of hydrogel or silicone hydrogel.

In at least one embodiment, when the ophthalmic lens is a hydrogel lens, the matrix 10 and the reversible gel layer 20 are made of hydrogel, and, when the ophthalmic lens is a silicone hydrogel lens, the matrix 10 and the reversible gel layer 20 are made of silicone hydrogel.

The matrix 10 includes a back surface 101. The reversible gel layer 20 is formed on the back surface 101. The reversible gel layer 20 includes a contact surface 201 away from the back surface 101.

In this exemplary embodiment, radius of curvature of the contact surface 101 can be 8.8 millimeters, 8.6 millimeters, or 8.4 millimeters, before the ophthalmic lens 1 is worn.

When ophthalmic lens 1 is placed on the eye, the reversible gel layer 20 can have a reversible chemical reaction which changes its shape. The physical movement of molecular structure in the reversible gel layer 20 being limited by the eye of wearer, the reversible gel layer 20 can be closely in contact with eyeball of the wearer, thus radius of curvature of the contact surface 201 changes to match radius of corneal curvature of eye of wearer.

The reversible gel layer 20 can be a thermally reversible gel layer, a light induced reversible gel layer, a redox agent induced reversible gel layer, or an acid-base (pH value) induced reversible gel layer.

When the reversible gel layer 20 is a thermally reversible gel layer, the reversible gel layer 20 can includes thermally reversible block copolymer, and the thermally reversible block copolymer can have a reversible chemical reaction which changes its shape under a change of temperature. Such as, when a temperature is around the temperature of a human body, such as in a range of 30 degrees Celsius to 40 degrees Celsius, the reversible chemical bonds are polymerized, and the reversible gel layer 20 solidifies. When the ophthalmic lens 1 is worn, the block copolymer can have a reversible chemical reaction under the body temperature, then the reversible gel layer 20 can be closely in contact with eyeball of the wearer, thus radius of curvature of the contact surface 101 changes to equal to radiuses of corneal curvature of the eye of wearer.

The block copolymer can be ethylene-oxide-propylene-oxide block copolymer, polyoxyethylene-polyoxypropylene block copolymer, or other thermally reversible block copolymer.

When the reversible gel layer 20 is a light induced reversible gel layer, the reversible gel layer 20 can have a reversible chemical reaction under an irradiation by light. When the ophthalmic lens 1 is worn, the reversible gel layer 20 can have a reversible chemical reaction under sunlight or ultraviolet (UV) light, then the reversible gel layer 20 can be closely in contact with eyeball of the wearer, thus radius of curvature of the contact surface 101 can be changed to equal corneal radius of the eye of wearer.

The reversible gel layer 20 can include one or more of disulfide chemical bonds, hydrazone chemical bonds, phenyl boronic acid chemical bonds, metal coordination bonds, and cyclodextrin host-guest interaction bonds. The reversible gel layer 20 can further include catalyst of light.

When the reversible gel layer 20 is a redox agent induced reversible gel layer, the reversible gel layer 20 can have a reversible chemical reaction under an oxidizing agent or a reducing agent. The protein in human tears can be an oxidizing agent in the reversible chemical reaction. When the ophthalmic lens 1 is worn, the reversible gel layer 20 can have a reversible chemical reaction under the tears protein, then the reversible gel layer 20 can be closely in contact with eyeball of the wearer, thus radius of curvature of the contact surface 101 can be changed to equal corneal radiuses of the eye of wearer.

The reversible gel layer 20 can includes reversible disulfide/polysulfide chemical bonds. Before being used, the reversible disulfide/polysulfide chemical bonds are disconnected. When the reversible gel layer 20 is in contact with the tears protein, the reversible disulfide/polysulfide chemical bonds can be reconnected. The reversible disulfide/polysulfide chemical bonds can be disconnected by a reducing agent, such as cysteine. Thus, the ophthalmic lens 1 can be received in a reducing agent before being used, and the reducing agent includes cysteine.

When the reversible gel layer 20 is an acid-base induced reversible gel layer, the reversible gel layer 20 can have a reversible chemical reaction under a pH value around the pH value of the human tears, which is in a range of about 6 to about 7.5. When the ophthalmic lens 1 is worn, the reversible gel layer 20 can have a reversible chemical reaction under the tears, then the reversible gel layer 20 can be closely in contact with eyeball of the wearer, thus radius of curvature of the contact surface 101 can be suitably changed.

Figure 2:
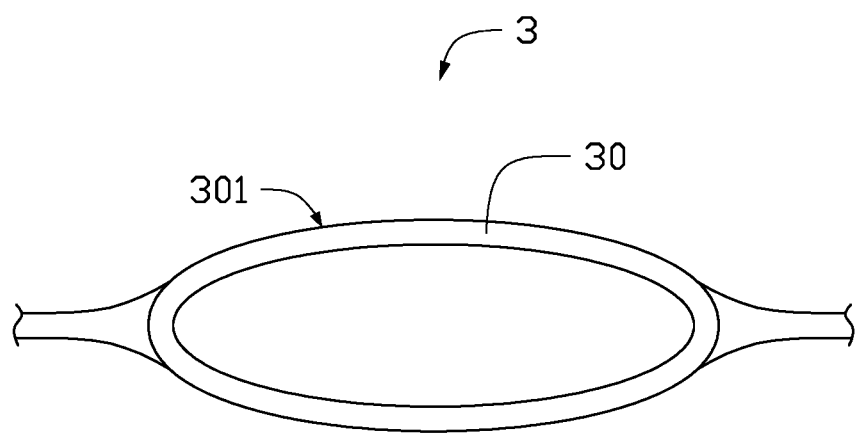
FIG. 2 is a cross-sectional view of an intraocular lens according to an exemplary embodiment.

FIG. 2 illustrates an exemplary embodiment of an automatically-adapting intraocular lens 3 including a reversible gel layer 30.

The reversible gel layer 30 can be made of hydrogel or silicone hydrogel.

In at least one embodiment, when the intraocular lens 3 is a hydrogel lens, the reversible gel layer 30 is made of hydrogel, and when the intraocular lens 3 is a silicone hydrogel lens, the reversible gel layer 30 is made of silicone hydrogel.

The reversible gel layer 30 includes a contact surface 301 for being in contact with eye of wearer.

When intraocular lens 3 is placed on the eye, the reversible gel layer 30 can have a reversible chemical reaction which changes its shape. The physical movement of molecular structure in the reversible gel layer 30 being limited by the eye of wearer, the reversible gel layer 30 can be closely in contact with eyeball of the wearer, thus radius of curvature of the contact surface 301 can be suitably changed.

The reversible gel layer 30 can be a thermally reversible gel layer, a light induced reversible gel layer, a redox agent induced reversible gel layer, or an acid-base (pH value) induced reversible gel layer.

When the reversible gel layer 30 is a thermally reversible gel layer, the reversible gel layer 30 can includes a block copolymer, and the block copolymer can have a reversible chemical reaction which changes its shape under a change of temperature. Such as, when a temperature is around the temperature of a human body, such as in a range of 30 degrees Celsius to 40 degrees Celsius, the reversible gel layer 30 is polymerized and solidifies. When the intraocular lens 3 is worn, the block copolymer can have a reversible chemical reaction under the body temperature, then the reversible gel layer 30 can be closely in contact with eyeball of the wearer, thus, radius of curvature of the contact surface 301 changes to equal to radiuses of corneal curvature of the eye of wearer.

The block copolymer can be ethylene-oxide-propylene-oxide block copolymer, polyoxyethylene-polyoxypropylene block copolymer, or other thermally reversible block copolymer.

When the reversible gel layer 30 is a light induced reversible gel layer, the reversible gel layer 30 can have a reversible chemical reaction under an irradiation by light. When the intraocular lens 3 is worn, the reversible gel layer 30 can have a reversible chemical reaction under sunlight or ultraviolet (UV) light, then the reversible gel layer 30 can be closely in contact with eyeball of the wearer, thus, radius of curvature of the contact surface 101 can be changed to equal to radiuses of corneal curvature of the eye of wearer.

The reversible gel layer 30 can includes one or more of disulfide chemical bonds, hydrazone chemical bonds, phenyl boronic acid chemical bonds, metal coordination bonds, and cyclodextrin host-guest interaction bond. The reversible gel layer 30 can further includes catalyst of light.

When the reversible gel layer 30 is a redox agent induced reversible gel layer, the reversible gel layer 30 can have a reversible chemical reaction under an oxidizing agent or a reducing agent. The protein in human tears can be an oxidizing agent in the reversible chemical reaction. When the intraocular lens 3 is worn, the reversible gel layer 30 can have a reversible chemical reaction under the tears protein, then the reversible gel layer 30 can be closely in contact with eyeball of the wearer, thus, radius of curvature of the contact surface 301 can be changed to equal to radiuses of corneal curvature of the eye of wearer.

The reversible gel layer 30 can includes reversible disulfide/polysulfide chemical bonds. Before being used, the reversible disulfide/polysulfide chemical bonds are disconnected. When the reversible gel layer 30 is in contact with the tears protein, the reversible disulfide/polysulfide chemical bonds can be reconnected. The reversible disulfide/polysulfide chemical bonds can be disconnected by a reducing agent, such as cysteine. Thus, the intraocular lens 3 can be received in a reducing agent before being used.

When the reversible gel layer 30 is an acid-base induced reversible gel layer, the reversible gel layer 30 can have a reversible chemical reaction under a pH value around a pH value of the human tears, which is in a range of about 6 to about 7.5. When the intraocular lens 3 is worn, the reversible gel layer 30 can have a reversible chemical reaction under the tear, then the reversible gel layer 30 can be closely in contact with eyeball of the wearer, thus, radius of curvature of the contact surface 301 can be changed to equal to radiuses of corneal curvature of the eye of wearer.

The exemplary embodiments shown and described above are only examples. Many details are often found in the art such as the other features of an intraocular lens 3. Therefore, many such details are neither shown nor described. Even though numerous characteristics and advantages of the present technology have been set forth in the foregoing description, together with details of the structure and function of the present disclosure, the disclosure is illustrative only, and changes may be made in the detail, especially in matters of shape, size, and arrangement of the sections within the principles of the present disclosure, up to and including the full extent established by the broad general meaning of the terms used in the claims. It will therefore be appreciated that the exemplary embodiments described above may be modified within the scope of the claims.

What is claimed is:

1. An automatically-adapting ophthalmic lens, comprising:
   a reversible gel layer, the reversible gel layer comprising a contact surface;
   wherein radius of curvature of the contact surface changes when under a reversible chemical reaction of the reversible gel layer.

2. The automatically-adapting ophthalmic lens of claim 1, wherein the reversible gel layer is a thermally reversible gel layer, the reversible gel layer has a reversible chemical reaction when under a temperature around the temperature of a human body.

3. The automatically-adapting ophthalmic lens of claim 2, wherein the reversible gel layer comprises thermally reversible block copolymer.

4. The automatically-adapting ophthalmic lens of claim 1, wherein the reversible gel layer is a light induced reversible gel layer, the reversible gel layer has a reversible chemical reaction when under the sunlight or ultraviolet light.

5. The automatically-adapting ophthalmic lens of claim 4, wherein the reversible gel layer comprises disulfide chemical bonds, hydrazone chemical bonds, phenyl boronic acid chemical bonds, metal coordination bonds, cyclodextrin host-guest interaction bonds, or any combination thereof.

6. The automatically-adapting ophthalmic lens of claim 4, wherein the reversible gel layer further comprises catalyst of light.

7. The automatically-adapting ophthalmic lens of claim 1, wherein the reversible gel layer is a redox agent induced reversible gel layer, the reversible gel layer has a reversible chemical reaction when under an oxidizing agent or a reducing agent.

8. The automatically-adapting ophthalmic lens of claim 7, wherein the reversible gel layer comprises reversible disulfide/polysulfide chemical bonds, before being used, the reversible disulfide/polysulfide chemical bonds are disconnected, when the reversible gel layer is in contact with the protein in human tears, the reversible disulfide/polysulfide chemical bonds is reconnected.

9. The automatically-adapting ophthalmic lens of claim 7, wherein the ophthalmic lens is received in reducing agent, the reducing agent comprises cysteine.

10. The automatically-adapting ophthalmic lens of claim 1, wherein the reversible gel layer is an acid-base induced reversible gel layer, the reversible gel layer has a reversible chemical reaction when under a pH value around the pH value of human tears.

11. An automatically-adapting intraocular lens, comprising:
a reversible gel layer, the reversible gel layer comprising a contact surface;
wherein radius of curvature of the contact surface changes when under a reversible chemical reaction of the reversible gel layer.

12. The automatically-adapting intraocular lens of claim 11, wherein the reversible gel layer is a thermally reversible gel layer, the reversible gel layer has a reversible chemical reaction when under a temperature around the temperature of a human body.

13. The automatically-adapting intraocular lens of claim 12, wherein the reversible gel layer comprises thermally reversible block copolymer.

14. The automatically-adapting intraocular lens of claim 11, wherein the reversible gel layer is a light induced reversible gel layer, the reversible gel layer has a reversible chemical reaction when under the sunlight or ultraviolet light.

15. The automatically-adapting intraocular lens of claim 14, wherein the reversible gel layer comprises disulfide chemical bonds, hydrazone chemical bonds, phenyl boronic acid chemical bonds, metal coordination bonds, cyclodextrin host-guest interaction bonds, or any combination thereof.

16. The automatically-adapting intraocular lens of claim 14, wherein the reversible gel layer further comprises catalyst of light.

17. The automatically-adapting intraocular lens of claim 11, wherein the reversible gel layer is a redox agent induced reversible gel layer, the reversible gel layer has a reversible chemical reaction when under an oxidizing agent or a reducing agent.

18. The automatically-adapting intraocular lens of claim 17, wherein the reversible gel layer comprises reversible disulfide/polysulfide chemical bonds, before being used, the reversible disulfide/polysulfide chemical bonds are disconnected, when the reversible gel layer is in contact with the protein of human tears, the reversible disulfide/polysulfide chemical bonds is reconnected.

19. The automatically-adapting intraocular lens of claim 17, wherein the intraocular lens is received in reducing agent, the reducing agent comprises cysteine.

20. The automatically-adapting intraocular lens of claim 11, wherein the reversible gel layer is an acid-base induced reversible gel layer, the reversible gel layer has a reversible chemical reaction when under a pH value around the pH value of human tears.

\* \* \* \* \*